(12) United States Patent
Ishikawa

(10) Patent No.: US 9,113,017 B2
(45) Date of Patent: Aug. 18, 2015

(54) OPERATION CONTROL METHOD, IMAGE PROCESSING APPARATUS AND NON-TRANSITORY COMPUTER-READABLE STORAGE MEDIUM

(71) Applicant: Konica Minolta, Inc., Tokyo (JP)

(72) Inventor: Tetsuya Ishikawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/222,060

(22) Filed: Mar. 21, 2014

(65) Prior Publication Data

US 2014/0285845 A1   Sep. 25, 2014

(30) Foreign Application Priority Data

Mar. 25, 2013   (JP) ................................. 2013-061518

(51) Int. Cl.
*H04N 1/413*   (2006.01)
*H04N 1/00*   (2006.01)

(52) U.S. Cl.
CPC ....... *H04N 1/00482* (2013.01); *H04N 1/00204* (2013.01); *H04N 1/00474* (2013.01); *H04N 1/00413* (2013.01); *H04N 2201/0075* (2013.01); *H04N 2201/0094* (2013.01)

(58) Field of Classification Search
CPC .......... H04N 1/00307; H04N 1/00204; H04N 1/00413; H04N 1/00474; H04N 1/00482; H04N 2201/0075; H04N 2201/0094
USPC ................... 358/1.1–1.9, 1.11–1.18
See application file for complete search history.

(56) References Cited

U.S. PATENT DOCUMENTS 5,699,494 A * 12/1997 Colbert et al. ............... 358/1.15
2004/0253981 A1 * 12/2004 Blume et al. ................ 455/552.1
2006/0203283 A1 * 9/2006 Fujimoto ..................... 358/1.15

(Continued)

FOREIGN PATENT DOCUMENTS

JP    11184567 A    7/1999
JP    2008301051 A    12/2008

(Continued)

OTHER PUBLICATIONS

Notification of Reasons for Refusal issued in corresponding Japanese Application No. 2013-061518 mailed Feb. 10, 2015 (6 pages).

*Primary Examiner* — King Poon
*Assistant Examiner* — Ibrahim Siddo
(74) *Attorney, Agent, or Firm* — Osha Liang LLP

(57) ABSTRACT

There are provided an operation control method of an image processing system including an image processing apparatus and a remote terminal; the image processing apparatus; and a non-transitory computer-readable storage medium storing an operation control program of the remote terminal. The method includes: operating the remote terminal to monitor a remaining life of the battery thereof, output a notification of a reduction of the remaining life, and in response to receiving the notification, send the image processing apparatus setup information having been set by an operator through an operating section of the remote terminal until receiving the notification; and operating the image processing apparatus to receive and store the setup information from the remote terminal, and on the operating section thereof receiving an operation to give an instruction for a continuation of the setup operations, to reflect the setup information to the setup screen displayed on the display section thereof.

12 Claims, 9 Drawing Sheets

(56) References Cited

U.S. PATENT DOCUMENTS

2008/0219589 A1* 9/2008 Jung et al. .............. 382/276
2011/0235115 A1* 9/2011 Nishio .................. 358/1.15
2012/0194854 A1* 8/2012 Tang et al. ............. 358/1.15

FOREIGN PATENT DOCUMENTS

JP   2011103572 A   5/2011
JP   2012065210 A   3/2012

* cited by examiner

OPERATION CONTROL METHOD, IMAGE PROCESSING APPARATUS AND NON-TRANSITORY COMPUTER-READABLE STORAGE MEDIUM

This application is based on Japanese Patent Application No. 2013-061518 filed on Mar. 25, 2013, in the Japan Patent Office, the entire content of which is hereby incorporated by reference.

TECHNICAL FIELD

The present invention relates to an operation control method, image processing apparatus and a non-transitory computer-readable storage medium storing an operation control program. In particular, the present invention relates to an operation control method of an image processing system capable of performing a remote operation for an image processing apparatus with a remote terminal, for controlling operations in accordance with the condition of a battery of the remote terminal, and to the image processing apparatus and a non-transitory computer-readable storage medium storing a program to control operations of the remote terminal.

BACKGROUND

In recent years, there have been provided image processing apparatuses, such as a MFP (Multi-Function Peripheral), having a function which can receive a remote operation from dedicated operation terminals and communication terminals such as a smart phone and a tablet terminal (hereafter, these terminals are collectively called as "remote terminals"). When such an image processing apparatus is connected to a remote terminal through a communication network such as a wireless LAN (Local Area Network), an operator can remotely operate the image processing apparatus installed at a distant location from the remote terminal.

With regard to such a remote operation, Japanese Unexamined Patent Publication (JP-A) No. 2012-065210 discloses an image information processing apparatus which includes an operation panel to display an operation screen, a storage device capable of memorizing a first application and a second application, a judging section, and a program transferring section. Further, the image information processing apparatus is constituted as follows. The first application is configured to realize a process which includes a step of accessing the image information processing apparatus or an external apparatus and a step of acquiring information, when being executed by an information device capable of displaying an operation screen. The second application is configured to realize a process which includes a step of accessing the image information processing apparatus or an external apparatus and does not include a step of acquiring information. When an information device is connected, the judging section is configured to judge whether the information device corresponds to an operation device. The program transferring section is configured to download the first application into the information device when the information device corresponds to the operation device, and to download the second application into the information device when the information device does not correspond to the operation device.

Further, JP-A No. 2011-103572 discloses a print system which includes an image processing apparatus and a mobile device. The image processing apparatus includes a short distance wireless communication section, a memory region storing a program to control an operation panel control section, and a control section to execute the control of the operation panel control section in accordance with the program. The print system is constituted as follows. When a mobile device links with the image processing apparatus via the short distance wireless communication section, a message to notify the matter of linking and a message to request acknowledgement are displayed on the operation panel of each of the image processing apparatus and the mobile device. Then, it is confirmed whether the storage section of one of the image processing apparatus and the mobile device having firstly performed an acknowledgement operation has already read therein a common user interface program or a script. As a result, if not, the common user interface program or the script is transferred from the other to the one of the image processing apparatus and the mobile device having firstly performed the acknowledgement operation via the short distance wireless communication section. Subsequently, the control of the operation panel control section is executed based on the common user interface program or the script until the linking is released.

Furthermore, JP-A No. H11-184567 discloses a data processing system which includes a first data processing apparatus to receive an input operation for processing data and a second data processing apparatus to execute a processing action based processing data. The data processing system is constituted as follows. The first data processing apparatus and the second data processing apparatus are connected to each other such that data are sent and received between them. The first data processing apparatus includes a power saving function to cut off a power source when a waiting state waiting for an input operation of processing data continues for a predetermined time period, and the power saving function is configured to be made invalid during the first data processing apparatus and the second data processing apparatus are connected to each other.

As mentioned above, various control methods have been proposed with regard to the control between each type of processing apparatuses and a remote terminal. However, many of remote terminals run on a battery, and in the conventional technique, no consideration is taken for the case where the voltage of the battery of a remote terminal decreases during the control, which can cause a requirement of redoing of setup operations (setting operations). For example, when the voltage of the battery of a remote terminal decreases in the course of a remote operation, setup operations which have been performed at a remote terminal side are needed to be redone from the beginning at an image processing apparatus side or at another remote terminal side, which causes the problem that the setup operations become troublesome. The present invention seeks to solve the problem.

SUMMARY

There are disclosed illustrative operation control methods, image processing apparatuses and non-transitory computer-readable storage media each storing an operation control program.

An operation control method reflecting one aspect of the present invention is an operation control method of an image processing system comprising an image processing apparatus and a remote terminal connected with each other by a wireless communication. The image processing apparatus includes a display section configured to display a setup screen about features of the image processing apparatus, and an operating section. The remote terminal runs on a battery and includes an operating section configured to receive setup operations about features of the image processing apparatus. The method comprises: operating the remote terminal to monitor a remaining life of the battery; and operating the remote terminal to output a notification of a reduction of the remaining life of the battery on the remaining life of the battery becoming a predetermined threshold or less. The method further comprises, in response to receiving the notification, operating the remote terminal to send setup information to the image processing apparatus, where the setup information is that having been set by a setup operation or setup operations of an operator through the operating section of the remote terminal until receiving the notification. The method further comprises operating the image processing apparatus to receive and store the setup information from the remote terminal; and operating the image processing apparatus, on the operating section of the image processing apparatus receiving an operation to give an instruction for a continuation of the setup operation or setup operations, to reflect the setup information to the setup screen displayed on the display section of the image processing apparatus.

An image processing apparatus reflecting one aspect of the present invention is an image processing apparatus which can be connected with a remote terminal by a wireless communication. The remote terminal runs on a battery and includes the operating section configured to receive setup operations about features of the image processing apparatus. The image processing apparatus comprises: a display section configured to display a setup screen about features of the image processing apparatus; and an operating section configured to receive operations of operators. The image processing apparatus further comprises a setup reflecting section configured to receive and store setup information from the remote terminal, where the setup information is that having been set by a setup operation or setup operations of an operator through an operating section of the remote terminal, and on the operating section of the image processing apparatus receiving an operation to give an instruction for a continuation of the setup operation or setup operations, reflect the setup information to the setup screen displayed on the display section.

A non-transitory computer-readable storage medium reflecting one aspect of the present invention stores a program to control operations of a remote terminal. The remote terminal runs on a battery and is connected with an image processing apparatus which can display a setup screen about features of the image processing apparatus. The remote terminal includes an operating section configured to receive setup operations about features of the image processing apparatus. The program, which being executed by a processor of the remote terminal, causes the remote terminal to perform processing comprising: monitoring a remaining life of the battery; outputting a notification of a reduction of the remaining life of the battery on the remaining life of the battery becoming a predetermined threshold or less; and in response to receiving the notification, sending setup information to the image processing apparatus, where the setup information is that having been set by a setup operation or setup operations of an operator through the operating section of the remote terminal until receiving the notification.

As other aspects of the present invention, there can be provided the following image processing system, a remote terminal and a non-transitory computer-readable storage medium storing a control operation program.

An image processing system reflecting one aspect of the present invention is an image processing system comprising an image processing apparatus and a remote terminal connected with each other by a wireless communication. The remote terminal runs on a battery and includes the battery, a battery monitoring section configured to monitor a remaining life of the battery and output a notification of a reduction of the remaining life of the battery on the remaining life of the battery becoming a predetermined threshold or less, an operating section configured to receive setup operations about features of the image processing apparatus and, a control section configured to, in response to receiving the notification from the battery monitoring section, send setup information to the image processing apparatus, where the setup information is that having been set by a setup operation or setup operations of an operator through the operating section of the remote terminal until receiving the notification. The image processing apparatus includes: a display section configured to display a setup screen about features of the image processing apparatus, an operating section configured to receive operations of operators; and a setup reflecting section configured to receive and store the setup information from the remote terminal, and on the operating section of the image processing apparatus receiving an operation to give an instruction for a continuation of the setup operation or setup operations, reflect the setup information to the setup screen displayed on the display section.

A remote terminal reflecting one aspect of the present invention is a remote terminal which can be connected with an image processing apparatus. The image processing apparatus can display a setup screen about features of the image processing apparatus. The remote terminal comprises: an operating section configured to receive setup operations about features of the image processing apparatus; a battery; a battery monitoring section configured to monitor a remaining life of the battery and output a notification of a reduction of the remaining life of the battery on the remaining life of the battery becoming a predetermined threshold or less. The remote terminal further comprises a control section configured to, in response to receiving the notification from the battery monitoring section, send setup information to the image processing apparatus, where the setup information is that having been set by a setup operation or setup operations of an operator through the operating section of the remote terminal until receiving the notification.

A non-transitory computer-readable storage medium reflecting one aspect of the present invention stores a program to control operations of an image processing apparatus including a display section configured to display a setup screen about features of the image processing apparatus and an operating section. The image processing apparatus is connected with a remote terminal which runs on a battery and is configured to receive setup operations about features of the image processing apparatus. The program, which being executed by a processor of the image processing apparatus, causes the image processing apparatus to perform processing comprising: receiving and storing setup information from the remote terminal, where the setup information is that having been set by a setup operation or setup operations of an operator through an operating section of the remote terminal; and on the operating section of the image processing apparatus receiving an operation to give an instruction for a continuation of the setup operation or setup operations, reflecting the setup information to the setup screen displayed on the display section.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
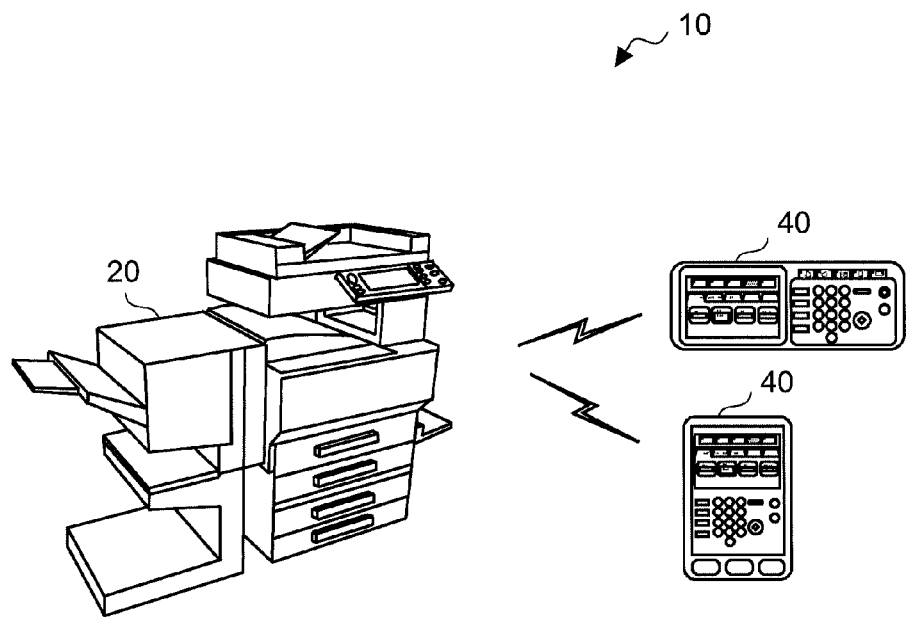
FIG. 1 is an illustration schematically showing a constitution of an image processing system in relation to one embodiment of the present invention.

Illustrative embodiments of operation control methods, image processing apparatuses and non-transitory computer-readable storage media each storing an operation control program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to illustrative operation control methods, image processing apparatuses and non-transitory computer-readable storage media each storing an operation control program as embodiments of the present invention, even when the voltage of the battery of the remote terminal decreases, an operator can execute setup operations for the image processing apparatus successively.

The reasons why an operator can execute setup operations for the image processing apparatus successively are as follows. Namely, the remote terminal is configured to monitor the condition of a battery in itself and to, when the voltage of the battery decreases to a predetermined threshold value or less, send setup information having been set by setup operations in the remote terminal until that time to the image processing apparatus. Then, the image processing apparatus or another remote terminal having acquired the setup information from the image processing apparatus is configured to reflect the setup information to a setup screen displayed on the display section thereof upon receipt of an operation to give an instruction for continuation of the setup operations, so that the operator can perform subsequent setup operations on the setup screen.

Further, the remote terminal is configured to send identification information for identifying an operator to the image processing apparatus, in addition to the setup information. Then, the image processing apparatus or another remote terminal having acquired the identification information from the image processing apparatus is configured to determine based on the identification information whether the operator has an operation right to perform subsequent setup operations or not, reflect the setup information to the setup screen when receiving an operation to give an instruction for continuation of the setup operation or setup operations and determining that the operator has the operation right, so that the operator can perform subsequent setup operations on the setup screen.

As illustrated in the description about the background, the use of a remote terminal enables a remote operation for an image processing apparatus installed at a distant location. However, many of remote terminals run on a battery and an operator had to redo a setup operation from the beginning in the image processing apparatus or the another remote terminal, on a reduction of the battery voltage of a remote terminal in the course of a remote operation and a suspension of the remote operation, which caused the problem that the setup operation becomes troublesome.

In view of a situation that the battery voltage of a remote terminal decreases in the course of performing setup operations about functions of an image processing apparatus through the remote terminal, an image processing apparatus or another remote terminal as one embodiment of the present invention is configured to allow an operator to perform setup operations successively even under such the situation.

In more concrete terms, the remote terminal monitors the condition (the remaining life) of a battery in a self-terminal. When the voltage level as the remaining life of the battery becomes to a predetermined threshold value or less, the remote terminal outputs a notification of the reduction of the remaining battery life. In response to the notification, the remote terminal sends setup information having been set until that time to an image processing apparatus. Then, the image processing apparatus having received the setup information or another remote terminal having acquired the setup information from the image processing apparatus reflects the setup information to a setup screen displayed on the display section thereof, upon receipt of an operation to give an instruction for continuation of setup operations, so that an operator can perform subsequent setup operations on the setup screen.

Further, in order to enable an operator of a remote terminal to clarify an intention to continue setup operations by giving an instruction for continuation of setup operations in an image processing apparatus or another remote terminal so as to prevent a third person from performing an wrongful operation, the remote terminal sends identification information for identifying the operator in addition to the setup information to the image processing apparatus. Then, the image processing apparatus having received the identification information or another remote terminal having acquired the identification information from the image processing apparatus is configured to ask an operator to input identification information, to compare the received or acquired identification information with the inputted identification information so as to determine whether the operator has an operation right to perform setup operations, to reflect the setup information to the setup screen displayed on the display section of each device when receiving an operation to give an instruction for continuation of the setup operations and determining that the operator has the operation right, so that the operator can perform subsequent setup operations on the setup screen.

Accordingly, even if a remote operation cannot be performed with a remote terminal due to the lowering of the voltage of a battery, the above embodiments do not require an operator to redo setup operations through the image processing apparatus or another remote terminal from the beginning, which improves the operability remarkably.

EXAMPLE

Figure 2:
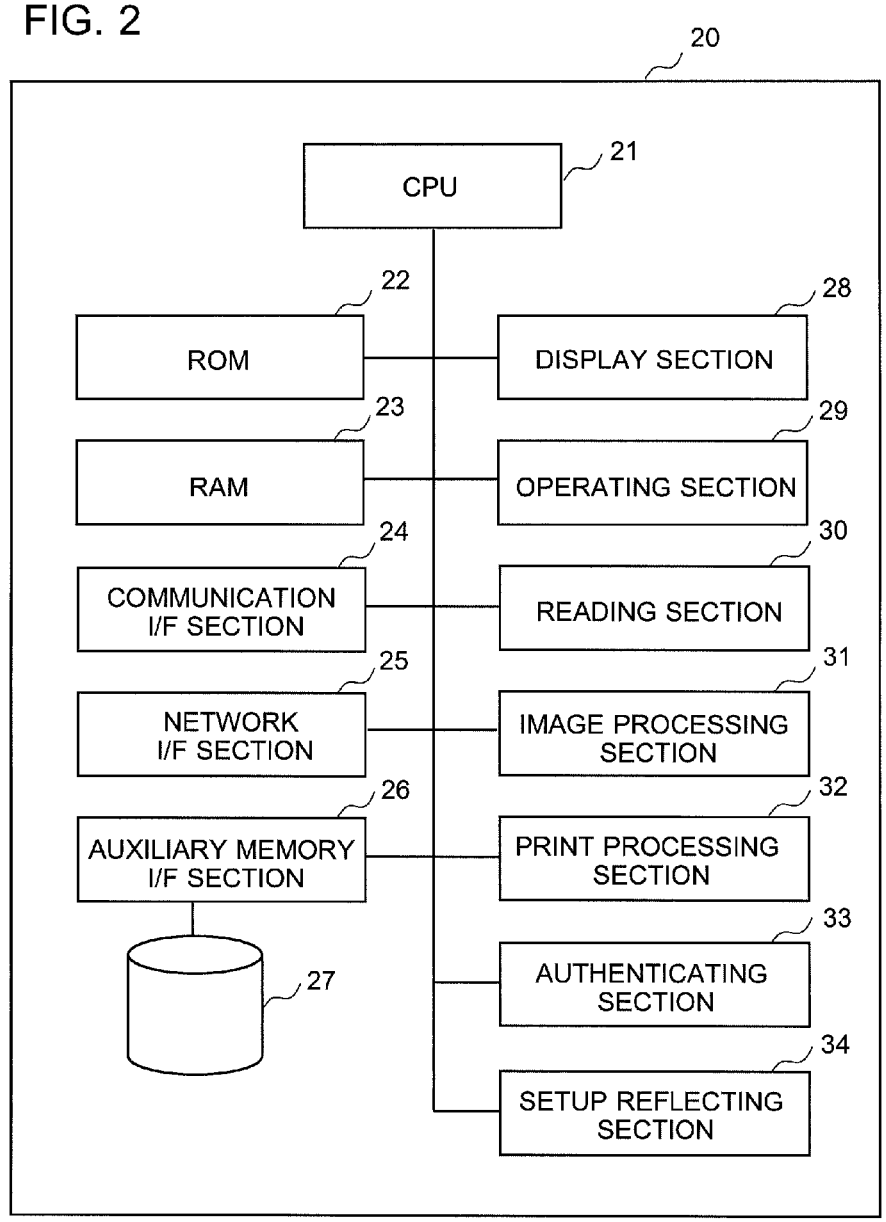
FIG. 2 is a block diagram showing a constitution of an image processing apparatus in relation to one embodiment of the present invention.
Figure 3:
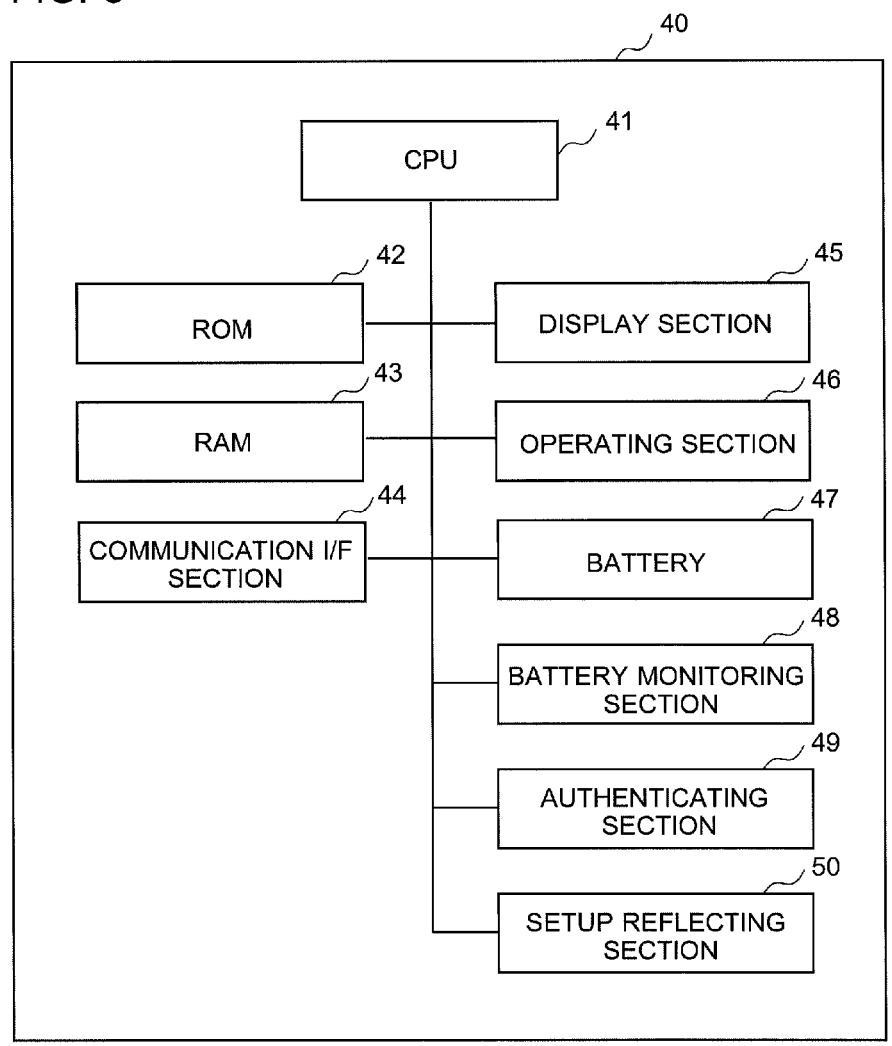
FIG. 3 is a block diagram showing a constitution of a remote terminal in relation to one embodiment of the present invention.
Figure 8A:
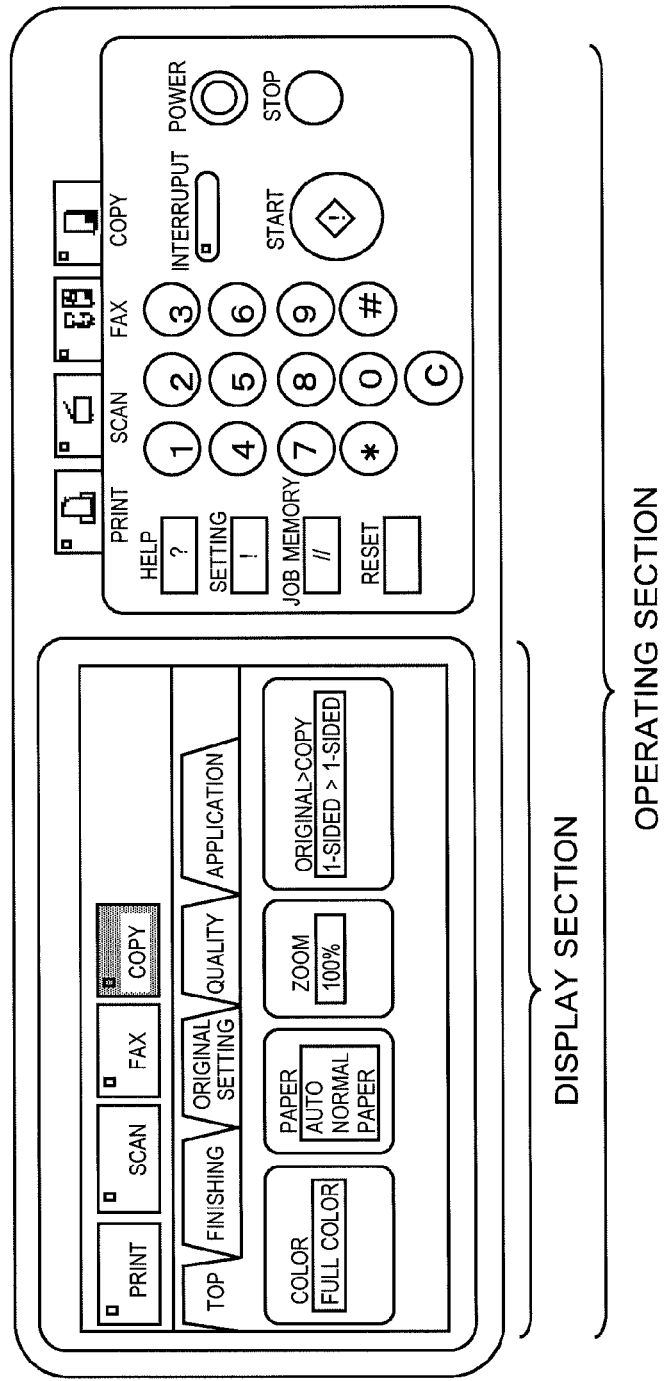
FIGS. 8A and 8B are an illustrative constitution of a display section and an operating section of a conventional image processing apparatus and an illustrative constitution of a display section and an operating section of an image processing apparatus in relation to one embodiment of the present invention.
Figure 8B:
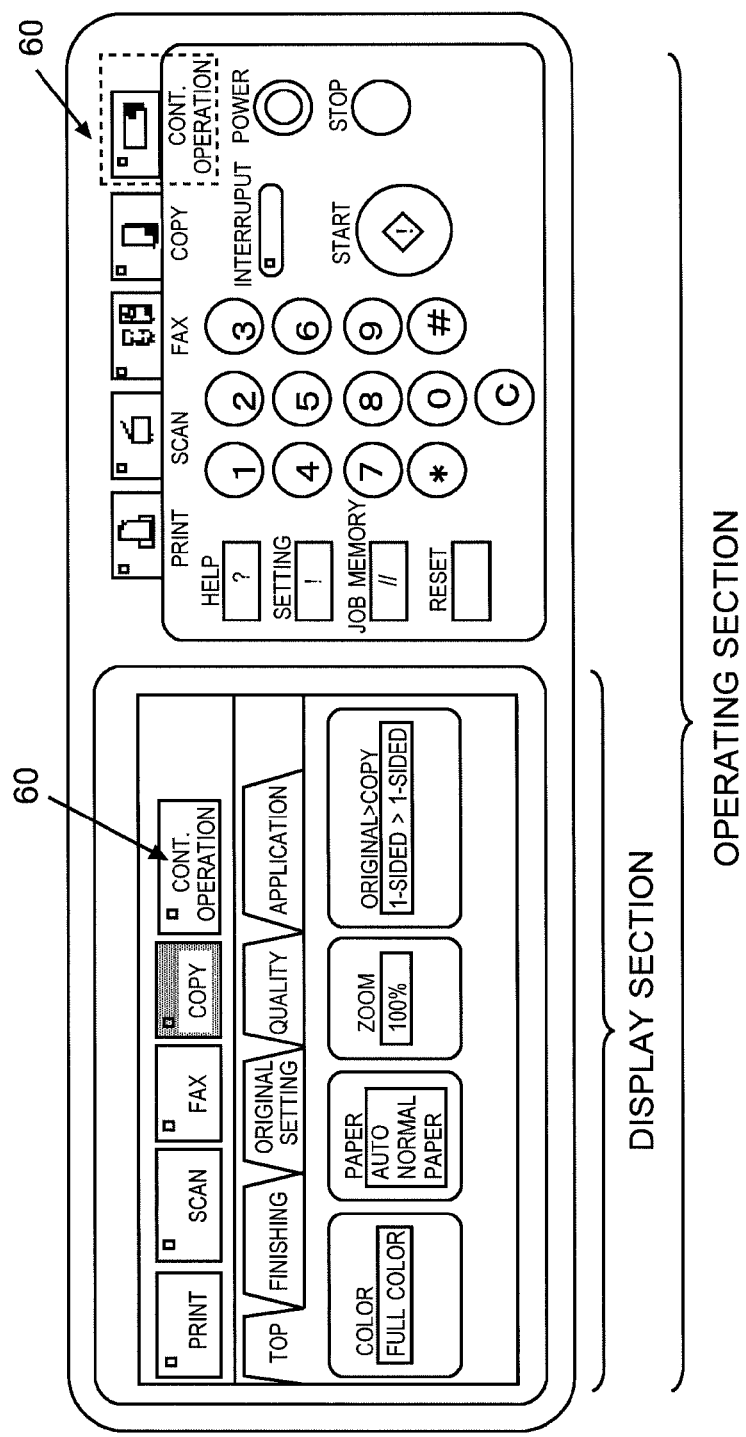

In order to describe the embodiments of the present invention in more details, description will be given to an image processing system, an image processing apparatus, a remote terminal, an operation control method and a non-transitory computer-readable medium storing an operation control program in relation to the present example with reference to FIGS. 1 to 8B. FIG. 1 is an illustration schematically showing a constitution of an image processing system of the present example, FIG. 2 is a block diagram showing a constitution of an image processing apparatus of the present example, and FIG. 3 is a block diagram showing a constitution of a remote terminal of the present example. Further, each of FIGS. 4 to 7 is a flowchart showing processing of the remote terminal or the image processing apparatus, and FIGS. 8A and 8B are an illustrative constitution of a display section and an operating section of a conventional image processing apparatus and an illustrative constitution of a display section and an operating section of an image processing apparatus of the present example.

As shown in FIG. 1, an image processing system 10 of the present example includes an apparatus (in the present example, referred to as an image processing apparatus 20) becoming a target of a remote operation (a remote operation from a distant location) and one or multiple terminals (each called as a remote terminal 40) configured to perform the remote operation. The image processing apparatus 20 and the one or multiple remote terminals 40 are connected with each other by a wireless communication network. Here, FIG. 1 shows a configuration in which the image processing apparatus 20 and the one or multiple remote terminals 40 are directly connected with each other via a wireless communication network. However, the image processing apparatus 20 and the one or multiple remote terminals 40 may be connected with each other via a device for a wireless communication such as a router. Hereafter, the image processing apparatus 20 and the remote terminal 40 will be described.

Image Processing Apparatus:

As shown in FIG. 2, the image processing apparatus 20 of the present example can be a MFP, and includes a CPU (Central Processing Unit) 21, a ROM (Read Only Memory) 22, a RAM (Random Access Memory) 23, a communication I/F (interface) section 24, a network I/F section 25, an auxiliary memory I/F section 26, an auxiliary memory 27, a display section 28, an operating section 29, a reading section 30, an image processing section 31, a print processing section 32, an authenticating section 33 and a setup reflecting section 34.

The CPU 21 is configured to execute a control program stored in the ROM 22, thereby performing arithmetic processing to manage the control of the whole of the image processing apparatus 20. The ROM 22 stores the control program to be executed by the CPU 21. The RAM 23 is configured to store the results of the arithmetic processing of the CPU 21, image data for printing and scanning, font data, and the like. A control section is constituted by the CPU 21, the ROM 22, the RAM 23, and the like.

The communication I/F section 24 is constituted by a device such as a NIC (Network Interface Card), and is configured to perform connection with a remote terminal 40 and other remote terminals 40 via wireless communication networks, i.e., wireless LANs established by specifications, such as Ethernet (registered trademark), a token ring, and a FDDI (Fiber-Distributed Data Interface). Further, the communication I/F section 24 is configured to receive information (called as setup information) about functions of the image processing apparatus 20 have been set by an operator through an operating section 46 of each remote terminal 40 being currently performing an remote operation and information (called as identification information) for identifying the operator. Furthermore, when the operator is going to perform succeeding setup operations through another remote terminal 40, the communication I/F section 24 is configured to send the setup information and the identification information received from the remote terminal 40 being currently performing the remote operation to the another remote terminal 40. Here, in the present example, the image processing apparatus 20 and the remote terminals 40 are constituted to be connected to each other via a wireless LAN. However, the connecting method should not be limited to the wireless LAN. For example, a short distance wireless communication, such as Bluetooth (registered trademark), an infrared ray communication, and a visible light communication may be also used.

The network I/F section 25 is constituted by a device such as a NIC, and is configured to perform connection with the respective computing devices as clients via a communication network such as a wireless LAN and a cable LAN. Further, the network I/F section 25 is configured to receive data such as a print job from the respective computing devices as the clients.

The auxiliary memory I/F section 26 is configured to control the auxiliary memory 27, to make the auxiliary memory 27 memorize information received through the communication I/F section 24 and the network I/F section 25, and to send the information taken out from the auxiliary memory 27 to the control section, the authenticating section 33 and the setup reflecting section 34.

The auxiliary memory 27 includes a built-in or external HDD (Hard Disk Drive), and is configured to memorize the setup information and the identification information received from a remote terminal 40 being currently performing a remote operation in addition to print jobs received from the respective computing devices as clients.

The display section 28 includes a LCD (Liquid Crystal Display), and is configured to display a setup screen to allow an operator to perform setup operations about the functions of the image processing apparatus 20 thereon, and an input screen to allow an operator to input identification information thereon. The operating section 29 includes a hard key and a touch sensor constituted by lattice-shaped transparent electrodes formed on the display section 28, and is configured to allow an operator to perform setup operations about functions of the image processing apparatus 20 and input operations of identification information. Further, if needed, in order to avoid confusion about operations between the case of performing usual setup operations and the case of performing setup operations subsequent to those performed through a remote terminal 40, a measure (a hard key and a menu on a screen, and the like) by which an operator can perform an operation to give an instruction for continuation of setup operations may be added to the operating section 29 or on the setup screen.

The reading section 30 is configured to read image data optically from a document on a document stand, and includes a light source to scan a document, an image sensor, such as CCDs (Charge Coupled Devices) to convert light reflected from a document into electrical signals, and an A-D converter to perform A/D conversion for electrical signals.

The image processing section 31 is configured to rasterize data of each page of a print job received from a computing device as a client so as to convert them into image data, and to perform image processing such as edge enhancement processing, smoothing processing, color conversion processing, and the like for image data read out by the reading section and image data rasterized based on a print job.

The print processing section 32 is configured to control print processing for paper sheets based on image data converted by the image processing section 31. In concrete terms, the print processing section 32 controls the print processing so as to form electrostatic latent images by irradiating a photoreceptor drum electrically charged via an electrification device with light corresponding to images from an exposure device, to develop the electrostatic latent images into toner images by making charged toner adhere to the electrostatic latent images in a developing device, to transfer the toner images primarily to a transfer belt, to transfer the toner images secondarily from the transfer belt to a paper sheet, and to fix the toner images onto the paper sheet in a fixing device.

The authenticating section 33 is configured to operate the display section 28 to display an input screen to receive an input of identification information. The authenticating section 33 is further configured to compare the identification information acquired from a remote terminal 40 (for example, information to identify an operator, such as an ID, a password, and biometrics identification information; and information to identify the remote terminal 40, such as a telephone number in the case that the remote terminal is a communication terminal, i.e., a smart phone) with the identification information inputted on the input screen. The authenticating section 33 is further configured to, under the condition that the two pieces of the identification information agree with each other, determine that the operator has an operation right to perform setup operations subsequent to the setup operations performed through the remote terminal 40.

The setup reflecting section 34 is configured to make the auxiliary memory 27 to memorize setup information received from a remote terminal 40 via the auxiliary memory I/F section 26, to analyze the setup information upon receipt of an instruction for continuation of setup operations given by an operation for the above-described menu, and to reflect the setup information set through the remote terminal 40 onto the setup screen. For example, under the situation that an operator has performed setup operations with regard to printing, such as the size of paper sheets, both-sided or one-sided print, color or monochrome print, the number of print sheets, and the like, through the remote terminal 40, the setup reflecting section 34 operate the display section 28 to display the setup screen with reflecting setup information set by the above setup operations onto the setup screen.

The above-mentioned authenticating section 33 and setup reflecting section 34 may be constituted as hardware. Alternatively, the control section may work as the authenticating section 33 and the setup reflecting section 34 (in particular, as the setup reflecting section 34) by executing an operation control program.

Remote Terminal:

As shown in FIG. 3, the remote terminal 40 of the present example can be a mobile terminal such as an operation terminal for exclusive use, a smart phone and a tablet terminal, and includes a CPU 41, a ROM 42, a RAM 43, a communication I/F (interface) section 44, a display section 45, an operating section 46, a battery 47, a battery monitoring section 48, an authenticating section 49 and a setup reflecting section 50.

The CPU 41 is configured to execute a control program stored in the ROM 42, thereby performing arithmetic processing to manage the control of the whole of the remote terminal 40. The ROM 42 stores data such as the control program to be executed by the CPU 41 and a threshold value used to judge the voltage condition of the battery 47. The RAM 43 is configured to store data such as arithmetic results of the CPU 41, setup information, identification information, and the like. A control section is constituted by the CPU 41, the ROM 42 and the RAM 43. This control section is configured to, in response to receiving from the below-mentioned battery monitoring section 48 a notification of lowering of the voltage of the battery 47, send setup information and identification information to the image processing apparatus 20 through the communication I/F section 44, where the setup information is that having been set by setup operations through the operating section 46 until receiving the notification, and the identification information is that having been registered or input to the image processing apparatus 20 previously.

The communication I/F section 44 is constituted by a device such as a NIC, and is configured to perform connection with the image processing apparatus 20 via a wireless communication network such as a wireless LAN. Further, the communication I/F section 44 is configured to send setup information and identification information to the image processing apparatus 20. As mentioned above, the connecting method between the image processing apparatus 20 and the remote terminal 40 should not be limited to the wireless LAN. For example, a short distance wireless communication such as Bluetooth (registered trademark), an infrared ray communication and a visible light communication may be also used.

The display section 45 is constituted by a LCD and the like, and is configured to display a setup screen used to allow an operator to perform setup operations with regard to the functions of the image processing apparatus 20 thereon, an input screen to allow an operator to input identification information thereon, and a selection screen to allow an operator to select whether to send setup information. Here, the above-mentioned setup screen, input screen, and selection screen may be made as a screen on a Web browser provided from the image processing apparatus 20 functioning as a Web server, a screen produced independently by a remote terminal 40 based on the apparatus information of the image processing apparatus 20, or a screen produced by an application (an application provided from a manufacturer which manufactures the image processing apparatus 20) to perform a remote operation for the image processing apparatus 20 in the case where a remote terminal 40 is a smart phone or a tablet terminal. The operating section 46 includes a hard key and a touch sensor constituted by lattice-shaped transparent electrodes formed on the display section 45 and is configured to allow an operator to perform setup operations with regard to the functions of the image processing apparatus 20 and operations to give the instruction whether to send setup information. Further, in another remote terminal 40 being different from a remote terminal 40 having performed a remote operation, if needed, in order to avoid confusion about operations between the case of performing usual setup operations and the case of performing subsequent setup operations, a measure (a hard key, a menu on a screen, and the like) by which an operator can perform an operation to give an instruction for continuation of setup operations may be added to the operating section 46 or on the setup screen.

The battery 47 is configured to supply electric power to actuate each section of a remote terminal 40. The battery monitoring section 48 is configured to monitor the voltage of the battery 47, and output a notification of the voltage condition to the control section when the voltage of the battery 47 became a predetermined threshold or less. Here, it is enough to change the control of the control section according to a remaining life of the battery 47 to realize one aspect of the present invention. The voltage of the battery 47 is merely one of measures to detect the remaining life of the battery 47. Accordingly, as long as the remaining quantity of the battery 47 can be detected, any index value (for example, an electric current value and the integrated quantity of the consumed power) other than the voltage may be monitored.

The authenticating section 49 is utilized in the case of being different from a remote terminal 40 being currently performing a remote operation. The authenticating section 49 is configured to acquire identification information from the image processing apparatus 20, to operate the display section 45 to display an input screen to allow an operator input identification information, to compare identification information acquired from the image processing apparatus 20 with identification information inputted on the input screen, and to determine that when the two pieces of the identification information agree with each other, the operator has an operation right to perform subsequent setup operations.

The setup reflecting section 50 is configured to operate the display section 45 to display a setup screen, an input screen, a selection screen, and the like. Further, in the above-mentioned another remote terminal 40, the setup reflecting section 50 is configured to acquire setup information from the image processing apparatus 20, to analyze the setup information, and to reflect the setup information having been set by a remote terminal 40 having performed a remote operation onto the setup screen.

The above-mentioned battery monitoring section 48, authenticating section 49, and setup reflecting section 50 may be constituted as hardware. Alternatively, the control section may work as the battery monitoring section 48, the authenticating section 49, and the setup reflecting section 50 (in particular, as the battery monitoring section 48 in a remote terminal 40 having performed an remote operation, and as the authenticating section 49 and the setup reflecting section 50 in another remote terminal 40 performing a setup operation successively) by executing an operation control program.

Here, the constitution shown in each of FIG. 2 and FIG. 3 is one example, and the remote terminal 40 may have any constitution which can perform a remote operation for the image processing apparatus 20.

Hereafter, description will be given to the actions of the image processing system 10 in the present example. First, processing of a remote terminal 40 in the present example is described with reference to a flowchart shown in FIG. 4. In the remote terminal 40, the CPU 41 is configured to execute a control program stored in the ROM 42, thereby performing the processing of the flowchart shown in FIG. 4.

The control section of the remote terminal 40 is connected to the image processing apparatus 20 being an operation target via the communication I/F section 25, performs the authentication of an operator if needed, and is made into a state capable of cooperating with the image processing apparatus 20 (S101). Then, the control section operates the display section 45 to display a setup screen used to perform a remote operation for the image processing apparatus 20 and receives a setup operation about functions of the image processing apparatus 20 performed by the operator through the operating section 46 (S102). Here, the above setup screen may be, as mentioned above, a screen on a Web browser provided from the image processing apparatus 20 which functions as a Web server, a screen produced uniquely by the remote terminal 40 based on the apparatus information of the image processing apparatus 20, or a screen produced by an application to perform a remote operation for the image processing apparatus 20.

Successively, the battery monitoring section 48 monitors the voltage of the battery 47, and determines whether the voltage of the battery 47 becomes to a predetermined threshold or less (for example, a voltage at which a message to urge battery charge is displayed) (S103). When the voltage of the battery 47 exceeds the threshold (NO at S103), the control section determines whether the setup operations have been completed (S106). Then, when the setup operations have been completed, the remote operation by the remote terminal 40 is ended. Alternatively, when the setup operations have not been completed, the flowchart is made return to S102, and the receiving of a setup operation is continued. Here, whether the setup operation has been completed can be determined based on whether the execution of a job is instructed (whether a start button is depressed), or whether the setup screen or the application for the remote operation is closed.

On the other hand, when the voltage of the battery 47 becomes the threshold value or less (YES at S103), the batter monitoring section 48 outputs a notification of the reduction of the battery voltage to the control section, and the control section, on receiving the notification, sends information (setup information) having been set by an operator based on the setup screen until receiving the notification and identification information to identify the operator to the image processing apparatus 20 connected with the control section (S104). Herein, the control section may be send just the setup information to exhibit effects of the embodiment of the present invention, or the control section may be send the setup information and the identification information as the present example. Further, the identification information may be stored beforehand in the remote terminal 40, may be inputted through the operating section 46, or may be read by a reading device configured to read biological information and information memorized in a tag. Further, the above-mentioned identification information may be information to identify the operator or information to identify the remote terminal 40.

Furthermore, the present example provides the remote terminal 40 configured to, when the voltage of the battery 47 becomes the threshold value or less, automatically send the setup information and the identification information to the image processing apparatus 20. Alternatively, the remote terminal 40 may be configured to operate the display section 45 to display a message to urge the operator to confirm whether to send the information to the image processing apparatus 20, and then send the information to the image processing apparatus 20 only when the operator gives an instruction. Moreover, the present example provides the remove terminal 40 configured to, when the voltage of the battery 47 is decreased, send the setup information and the identification information. Alternatively, the remove terminal 40 may be configured to send the setup information and the identification information at an arbitrary timing when the operator gives an instruction.

Thereafter, the battery monitoring section 48 monitors the voltage of the battery 47, and determine whether the voltage of the battery 47 is recovered by the battery charge or the exchanging of the battery 47 (S105). When the voltage of the battery 47 is recovered (YES at S105), since the remote operation can be resumed, the control section determines whether the setup operations have been completed (S106). Then, when the setup operations have been completed, the remote operation is ended. Alternatively, when the setup operations have not been completed, the flowchart is made return to S102, and the receiving of a setup operation is continued. On the other hand, when the voltage of the battery 47 is not recovered (NO at S105), since the remote terminal 40 cannot perform the remote operation, the processing is ended.

In the above-mentioned flowchart, the battery monitoring section 48 is configured to collectively send all pieces of the setup information having been set by setup operations performed until the voltage of the battery 47 decreases. However, for example, each piece of the setup information may be sent for each time that the corresponding setup operation is performed. Processing performed in the remote terminal 40 in that case will be described with reference to a flowchart shown in FIG. 5. With reference to the flowchart shown in FIG. 5, in the remote terminal 40, the CPU 41 is also configured to execute the control program stored in the ROM 42, thereby performing the processing of the flowchart shown in FIG. 5.

Similarly to the above, the control section of the remote terminal 40 is connected to the image processing apparatus 20 being an operation target via the communication I/F section 25, performs the authentication of an operator if needed, is made into a state capable of cooperating with the image processing apparatus 20 (S201). Then, the control section operates the display section 45 to display a setup screen used to perform a remote operation for the image processing apparatus 20. Then, each time when receiving a setup operation with regard to the functions of the image processing apparatus 20 performed by an operator through the operating section 46 (S202), the control section sends setup information to the image processing apparatus 20 (S203).

Successively, the battery monitoring section 48 monitors the voltage of the battery 47, and determines whether the voltage of the battery 47 becomes a predetermined threshold or less (S204). When the voltage of the battery 47 exceeds the threshold value (NO at S204), the control section determines whether the setup operations have been completed (S207). Then, when the setup operations have been completed, the remote operation is ended. Alternatively, when the setup operations have not been completed, the flowchart is made return to S202, and the setup operation is continued.

On the other hand, when the voltage of the battery 47 becomes the threshold value or less (YES at S204), the batter monitoring section 48 outputs a notification of the reduction of the battery voltage to the control section, and the control section, on receiving the notification, sends identification information to identify the operator to the image processing apparatus 20 connected with the control section (S205). Subsequently, the battery monitoring section 48 determines whether the voltage of the battery 47 is made recover by the electric charge or replacement of the battery 47 (S206). When the voltage of the battery 47 is recovered (YES at S206), since the remote operation can be resumed, the control section determines whether the setup operation is completed (S207). Then, when the setup operations have been completed, the remote operation is ended. Alternatively, when the setup operations have not been completed, the flowchart is made return to S202, and the setup operation is continued. On the other hand, when the voltage of the battery 47 is not recovered (NO at S206), since the remote terminal 40 cannot perform the remote operation, the process is ended.

Figure 6:
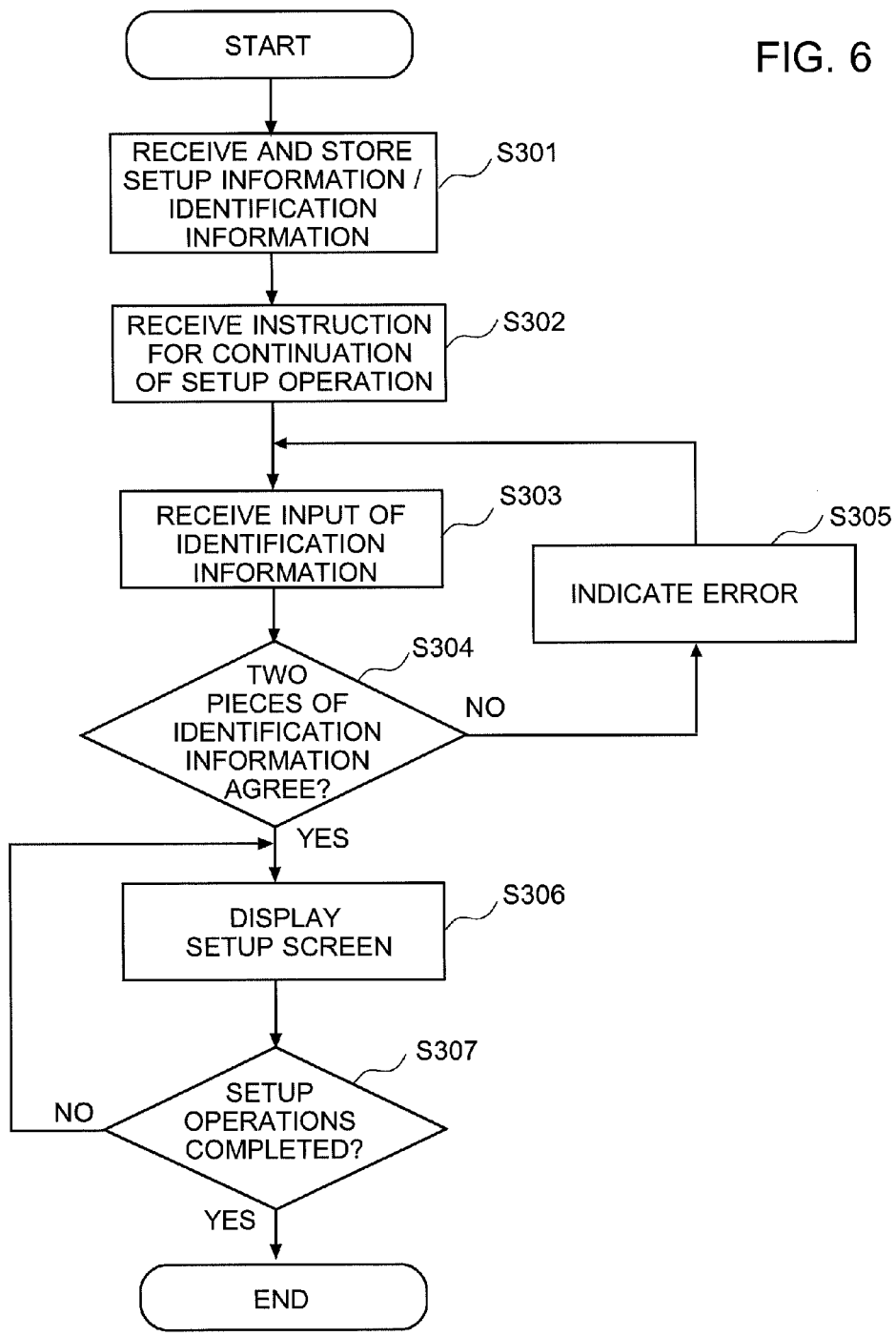
FIG. 6 is a flowchart showing processing (processing to perform subsequent operations) of an image processing apparatus in relation to one embodiment of the present invention.
Figure 7:
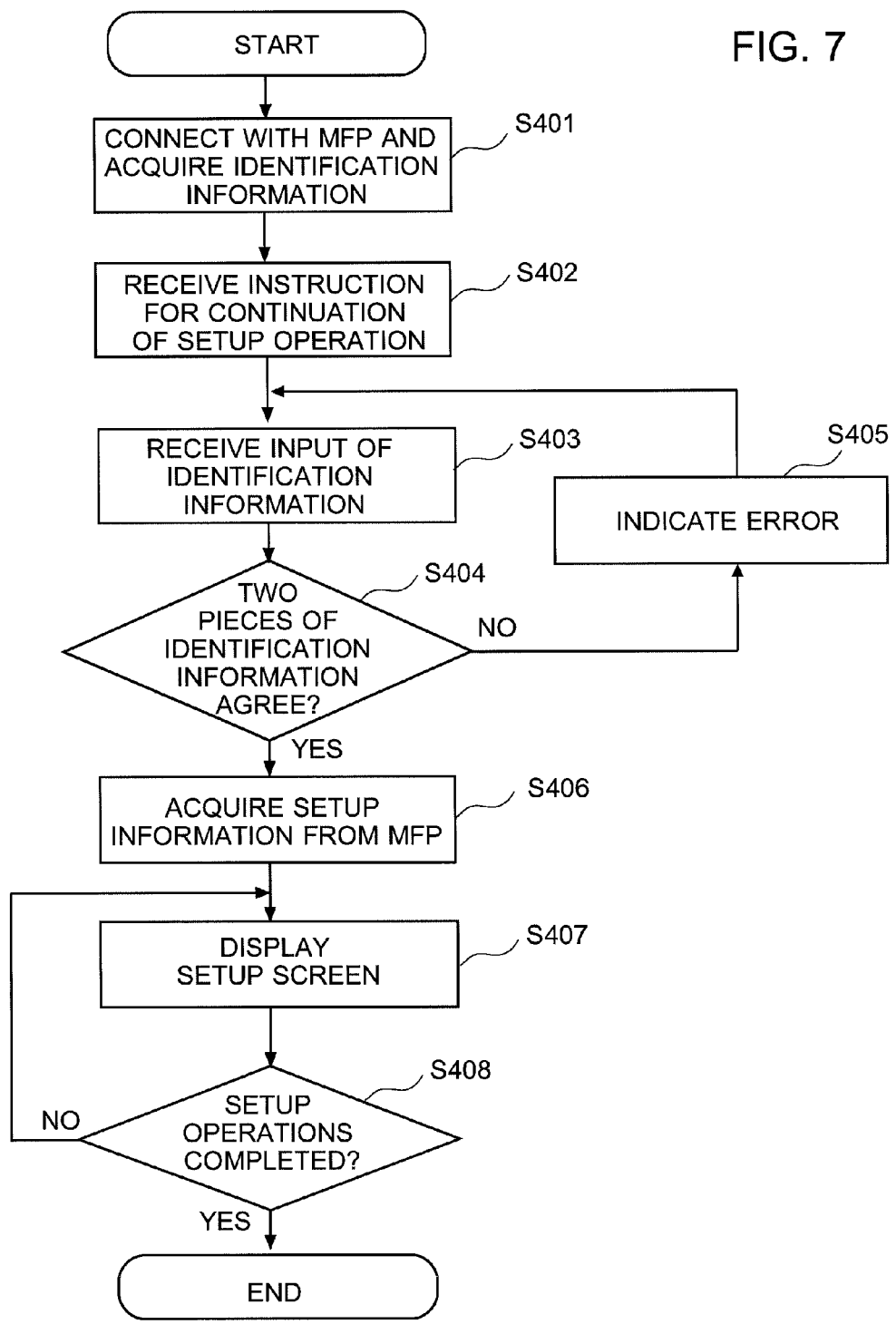
FIG. 7 is a flowchart showing processing (processing to perform subsequent operations) of another remote terminal in relation to one embodiment of the present invention.

Next, the actions of the image processing apparatus 20 in the present example are described with reference to a flowchart in FIG. 6. In the image processing apparatus 20, the CPU 21 executes a control program stored in the ROM 22, thereby performing processing of the flowchart shown in FIG. 6.

Figure 4:
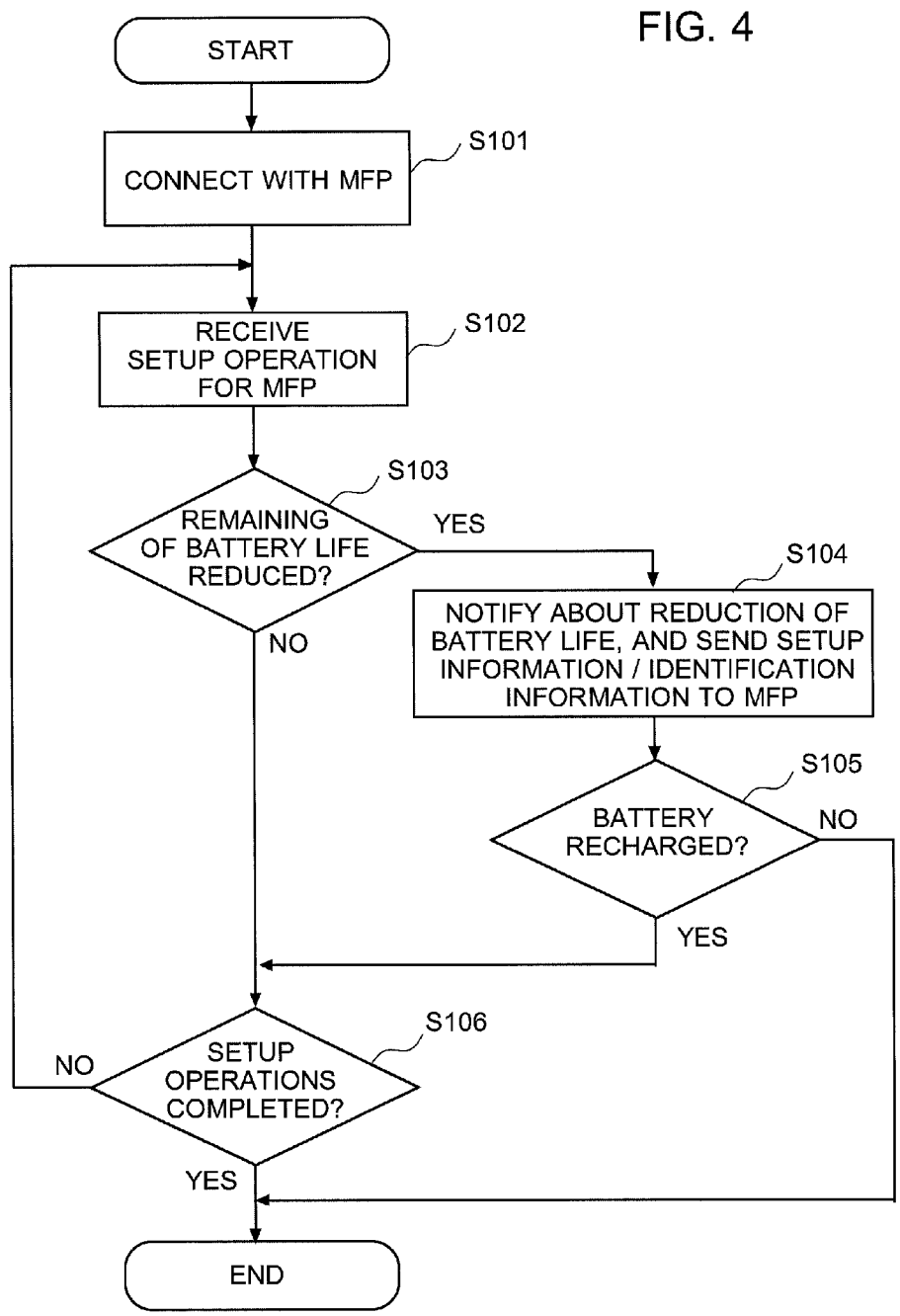
FIG. 4 is a flowchart showing processing of a remote terminal (in the case where all pieces of setup information are collectively sent to an image processing apparatus) in relation to one embodiment of the present invention.
Figure 5:
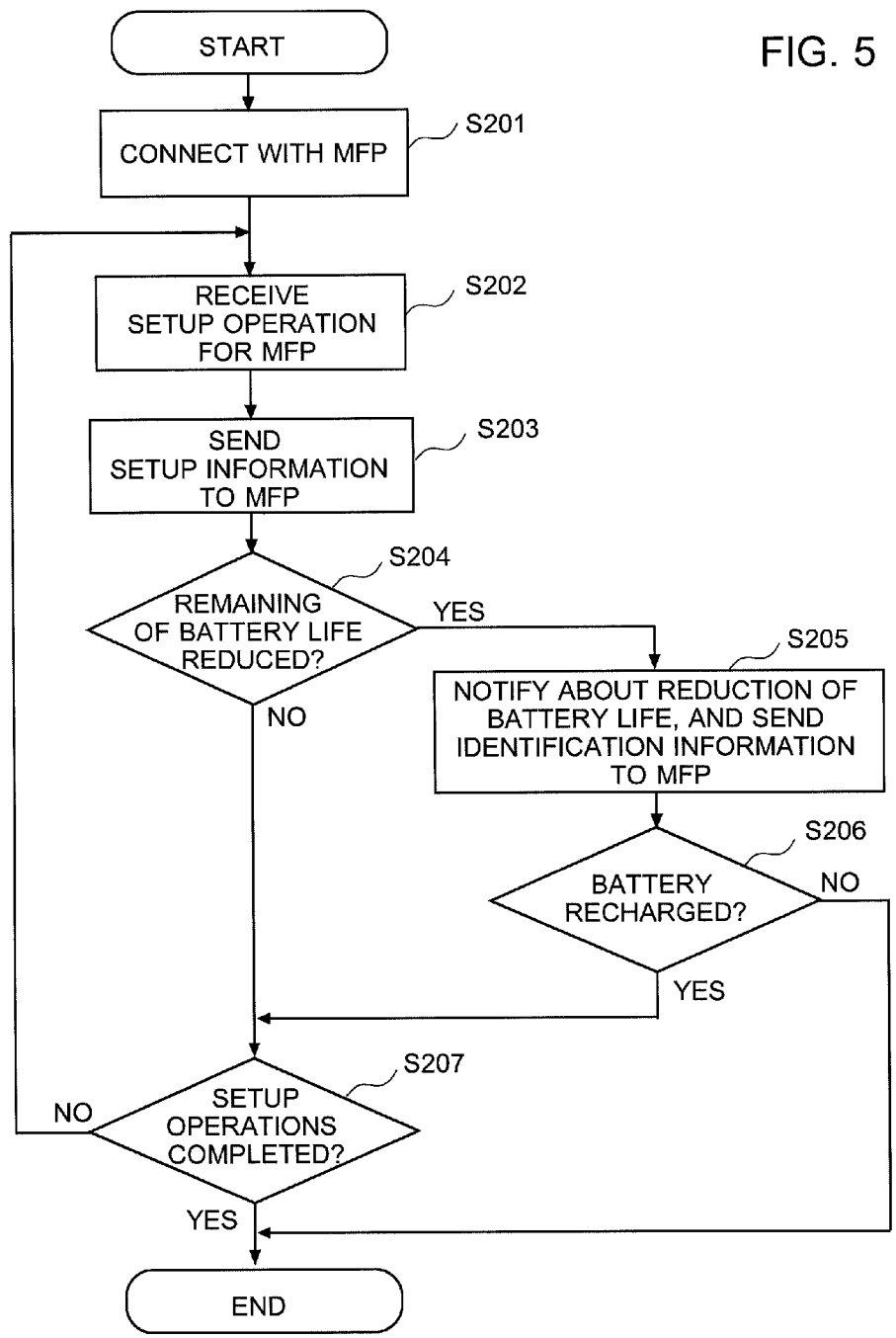
FIG. 5 is a flowchart showing processing of a remote terminal (in the case where each piece of setup information is sequentially sent to the image processing apparatus) in relation to one embodiment of the present invention.

The setup reflecting section 34 of the image processing apparatus 20 receives the setup information and the identification information sent from the remote terminal 40 at S104 in FIG. 4 or at S203 and S205 in FIG. 5, and stores them in the auxiliary memory 27 via the auxiliary memory I/F section 26 (S301).

With regard to the storage of the setup information, in the case where all pieces of the setup information are sent collectively from the remote terminal 40 (in the case of the flowchart shown in FIG. 4), the setup reflecting section 34 stores the identification information together with the all pieces of the setup information in the auxiliary memory 27. Then, when the voltage of the battery 47 is recovered, the setup operations are resumed in the remote terminal 40. Thereafter, when the setup information and the identification information are sent again due to the lowering of the voltage of the battery 47, the setup information is overwritten and stored.

In the case where the setup information is sequentially sent from the remote terminal 40 (in the case of the flowchart shown in FIG. 5), the setup reflecting section 34 stores the sent setup information in the auxiliary memory 27 with being associated with the other sent setup information. Then, when the voltage of the battery 47 is recovered, the setup operations are resumed in the remote terminal 40. Thereafter, when the setup information is sent again due to the lowering of the voltage of the battery 47, the sent setup information is stored with being associated with the previously-stored setup information.

Next, the setup reflecting section 34 receives an operation of the operator to give an instruction for continuation of the setup operations (S302). FIG. 8A shows the conventional constitution of the setup screen and the operating section 29, and FIG. 8B shows the constitution of the setup screen and the operating section 29 of the present example, where the setup screen and the operating section 29 allow an operator to perform an operation to give an instruction for continuation of setup operations thereon. As shown in FIG. 8B, there is additionally provided a measure to make an operator select whether to continue the setup operations on the setup screen and the operating section 29 displayed on the display section 28 (for example, a function button 60 to select "CONT. OPERATION" is added at the same line of the function buttons of COPY, FAX, SCAN and the like). In this connection, the reason why an instruction to continue the setup operation is requested is as follows. When a certain operator is performing a remote operation by using a setup screen of a remote terminal 40, another operator may be performing operations by using the setup screen of the image processing apparatus 20. In such a case, if the setup screen is changed instantly in reflection of the setup information, such the change can affect the operations of another operator. That is, the reason is to avoid the influence to the operations of another operator. Accordingly, in the present example, when an operation to give an instruction for continuation of setup operations is performed on the operating section 29, the setup reflecting section 34 reflects the setup information onto the setup screen. At that time, the setup reflecting section 34 may receive setup operations of another operator without reflecting the setup information onto the setup screen, until receiving the operation to give an instruction for continuation of setup operations.

When the operator performs the operation to give an instruction for continuation of setup operations, the authenticating section 33 operates the display section 28 to display a screen to allow an operator to input identification information. Here, the reasons why the input of identification information is requested are as follows. In the situation that a remote operation on a remote terminal 40 has been suspended due to the lowering of the voltage of the battery 47, when the voltage of the battery 47 is recovered, a reason is to allow an operator to determine based on the operator's own intention whether to resume the operation at the remote terminal 40 or to perform the subsequent setup operations at the image processing apparatus 20. In addition, another reason is to prevent another operator from performing setup operations successively at the image processing apparatus 20 without permission. The present example provides a structure such that the identification information is inputted on the screen. Such identification information may be read from the biological information or the information memorized in a tag.

Then, when an operator inputs identification information on the input screen of identification information (S303), the authenticating section 33 determines whether the identification information inputted on the input screen agrees with the identification information received from the remote terminal 40 at S301 (S304). When the two pieces of the identification information do not agree with each other, an error message is displayed (S305), the flowchart is made return to S303, and the operator is urged to input identification information again.

When the two pieces of the identification information agree with each other, it can be considered that the operator has an operation right to perform the subsequent setup operations at the image processing apparatus 20. Accordingly, the setup reflecting section 34 analyzes the setup information received from the remote terminal 40, and operates the display section 28 to display the setup screen with reflecting the setup information thereto (S306). Then, the operator is allowed to perform the subsequent setup operations through the operating section 29. That is, the setup reflecting section 34 reflects the setup information onto the setup screen on receiving the operation to give an instruction for continuation for subsequent setup operations and determining that the operator has the operation right.

Subsequently, the control section determines whether the setup operations have been completed (S307). Then, when the setup operations have been completed, the process is ended. Alternatively, when the setup operations have not been completed, the flowchart is made return to S306, and the setup operations are continued. Here, whether the setup operations have been completed is determined based on whether the execution of a job is instructed (whether a start button is depressed).

In the above-mentioned flowchart, description is given to the procedures in the case where the subsequent setup operations are performed at the image processing apparatus 20. Alternatively, under the condition that a plurality of remote terminals 40 are connected to the image processing system 10 and the voltage of the battery 47 of a remote terminal 40 (called as an original remote terminal 40) being currently performing a remote operation decreases, the subsequent setup operations may be performed by use of another remote terminal 40. Processing performed at the another remote terminal 40 in that case will be described with reference to a flowchart shown in FIG. 7. In the another remote terminal 40, the CPU 41 is configured to execute the control program stored in the ROM 42, thereby performing the processing of the flowchart shown in FIG. 7.

First, the control section of the another remote terminal 40 is connected to the image processing apparatus 20 being an operation target via the communication I/F section 25, cooperates with the image processing apparatus 20, and acquires identification information sent from the original remote terminal 40 via the image processing apparatus 20 (S401). Then, an operator performs an operation to give an instruction for continuation of setup operations through a measure by which an operator can select whether to perform the subsequent setup operation or not, where the measure (measure similarly to the function button 60 shown in FIG. 8B) is added to the setup screen and the operating section 46 displayed on the display section 45 (S402).

When the operator performs the operation to give an instruction for continuation of setup operations, the authenticating section 49 operates the display section 45 to display a screen to allow an operator to input identification information. Here, the reasons why the input of identification information is requested are as follows. In the situation that a remote operation on the original remote terminal 40 has been suspended due to the lowering of the voltage of the battery 47, when the voltage of the battery 47 is recovered, a reason is to allow an operator to determine based on the operator's own intention whether to resume the operation at the original remote terminal 40 or to perform the subsequent setup operations at another remote terminal 40. In addition, another reason is to prevent another operator from performing setup operations successively at another remote terminal 40 without permission.

Then, when the operator inputs identification information on the input screen of identification information (S403), the authenticating section 49 determines whether the identification information inputted on the input screen agrees with the identification information obtained via the image processing apparatus 20 at S401 (S404). When the two pieces of the identification information do not agree with each other, an error message is displayed (S405), the flowchart returns to S403, and the operator is urged to input identification information again.

When the two pieces of the identification information agree with each other, it can be considered that the operator has an operation right to perform the subsequent setup operations at another remote terminal 40 (namely, the operator of the original remote terminals 40 agrees with the operator of another remote terminals 40). Accordingly, the setup reflecting section 50 receives the setup information sent from the original remote terminal 40 via the image processing apparatus 20 (S406). Successively, the setup reflecting section 50 analyzes the setup information received from the remote terminal 40, and operates the display section 45 to display the setup screen with reflecting the setup information thereto (S407). Then, the operator is allowed to perform the subsequent setup operations through the operating section 46. That is, the setup reflecting section 50 reflects the setup information onto the setup screen on receiving the operation to give an instruction for continuation for subsequent setup operations and determining that the operator has the operation right.

Subsequently, the control section determines whether the setup operations have been completed (for example, the execution of a job is instructed) (S408). Then, when the setup operations have been completed, the processing is ended. Alternatively, when the setup operations have not been completed, the flowchart is made return to S407, and the setup operation is continued.

In this way, in the present example, the remote terminal 40 monitors the voltage of the battery 47 in the self-terminal and outputs a notification in the case where the voltage of the battery 47 decreases to a threshold or less in the course of a remote operation. In response to receiving the notification, the remote terminal sends setup information having been set by setup operations performed until that time to the image processing apparatus 20. Successively, the image processing apparatus 20 or another remote terminal 40 receives the setup information and reflects the setup information onto the setup screen so as to allow the operator to perform the subsequent setup operations. Accordingly, it becomes possible to omit the operator's time and labor to redo the setup operations from the beginning, thereby improving operability.

The present invention should not be restricted to the above described examples, but its configuration and control are arbitrarily changeable without departing from the spirit and scope of the present invention.

For example, in the above-mentioned example, when another remote terminal 40 performs the subsequent setup operations, another remote terminal 40 is configured to receive the setup information and the identification information via the image processing apparatus 20. However, the setup information and the identification information are sent directly from a remote terminal 40 being currently performing a remote operation to another remote terminal 40.

Further, in the above-mentioned example, the image processing apparatus 20 is exemplified as a target apparatus to which the remote terminal 40 performs a remote operation. However, the control method of the present invention may be also applicable to an arbitrary apparatus to which a remote operation can be performed.

Furthermore, in the above-mentioned example, a case where the subsequent setup operations are performed at the image processing apparatus 20 and a case where the subsequent setup operations are performed at another remote terminal 40 are shown individually. However, a mode in which the subsequent setup operations are performed at the image processing apparatus 20 and a mode in which the subsequent setup operations are performed at another remote terminal 40 are established in parallel, and the image processing system may be configured to allow a user to select either one of the apparatuses to be used for performing the subsequent setup operations.

The invention claimed is:

1. An operation control method of an image processing system comprising an image processing apparatus and a remote terminal connected with each other by a wireless communication,
the image processing apparatus including a display section that displays a setup screen about features of the image processing apparatus, and an operating section,
the remote terminal running on a battery and including an operating section that receives setup operations about features of the image processing apparatus, the method comprising:
operating the remote terminal to monitor a remaining life of the battery;
operating the remote terminal to output a notification of a reduction of the remaining life of the battery on the remaining life of the battery becoming a predetermined threshold or less;
in response to receiving the notification, operating the remote terminal to send setup information to the image processing apparatus, the setup information having been set by a setup operation or setup operations of an operator through the operating section of the remote terminal until receiving the notification;
operating the image processing apparatus to receive and store the setup information from the remote terminal; and
operating the image processing apparatus, on the operating section of the image processing apparatus receiving an operation to give an instruction for a continuation of the setup operation or setup operations, to reflect the setup information to the setup screen displayed on the display section of the image processing apparatus.

2. The operation control method of claim 1,
wherein the operating of the image processing apparatus to reflect the setup information to the setup screen includes operating the image processing apparatus to receive a setup operation or setup operations of another operator through the operating section of the image processing apparatus without reflecting the setup information to the setup screen, until the operating section of the image processing apparatus receiving the operation to give the instruction for the continuation of the setup operation or setup operations.

3. The operation control method of claim 1,
wherein the operating of the remote terminal to send setup information to the image processing apparatus includes operating the remote terminal to send identification information for identifying the operator to the image processing apparatus,
the operating of the image processing apparatus to receive and store the setup information from the remote terminal includes operating the image processing apparatus to receive and store the identification information, and
the operating of the image processing apparatus to reflect the setup information to the setup screen includes operating the image processing apparatus to:
receive an input of an identification information inputted through the operating section of the image processing apparatus as a second identification information,
compare the identification information received from the remote terminal with the second identification information to determine whether the operator has an operation right to perform setup operations in the image processing apparatus, and
reflect the setup information to the setup screen, on the operating section of the image processing apparatus receiving the operation to give the instruction for the continuation of the setup operation or setup operations and on determining that the operator has the operation right.

4. The operation control method of claim 1,
wherein the image processing system further includes another remote terminal connected with the image processing apparatus by a wireless communication,
the operating of the remote terminal to send the setup information to the image processing apparatus includes operating the remote terminal to send identification information for identifying the operator to the image processing apparatus, and
the method further comprises operating the another remote terminal to:
acquire the setup information and the identification information from the image processing apparatus,
receive an input of an identification information inputted in the another remote terminal as a third identification information,
compare the identification information acquired from the image processing apparatus with the third identification information to determine whether the operator has an operation right to perform setup operations in the another remote terminal, and
reflect the setup information to a setup screen about features of the image processing apparatus displayed on a display section of the another remote terminal, on the another remote terminal receiving an operation to give an instruction for the continuation of the setup operation or setup operations and on determining that the operator has the operation right.

5. A non-transitory computer-readable storage medium storing a program to control operations of a remote terminal, the remote terminal running on a battery and being connected with an image processing apparatus that can display a setup screen about features of the image processing apparatus, the remote terminal including an operating section that receives setup operations about features of the image processing apparatus, the program, when executed by a processor of the remote terminal, causing the remote terminal to perform processing comprising:

monitoring a remaining life of the battery;

outputting a notification of a reduction of the remaining life of the battery on the remaining life of the battery becoming a predetermined threshold or less; and in response to receiving the notification, sending setup information to the image processing apparatus, the setup information having been set by a setup operation or setup operations of an operator through the operating section of the remote terminal until receiving the notification.

6. The non-transitory computer-readable storage medium of claim 5, wherein, when the remaining life of the battery becomes less than or equal to the predetermined threshold, a control section of the remote terminal sends identification information that identifies the operator to the image processing apparatus.

7. An image processing system comprising:

an image processing apparatus comprising:
  a display section that displays a setup screen about features of the image processing apparatus; and
  an operating section; and a remote terminal connected to the image processing apparatus by a wireless communication, the remote terminal running on a battery and comprising an operating section that receives setup operations about features of the image processing apparatus, wherein the remote terminal monitors a remaining life of the battery, the remote terminal outputs a notification of a reduction of the remaining life of the battery on the remaining life of the battery becoming a predetermined threshold or less;

in response to receiving the notification, the remote terminal sends setup information to the image processing apparatus, the setup information having been set by a setup operation or setup operations of an operator through the operating section of the remote terminal until receiving the notification, the image processing apparatus receives and stores the setup information from the remote terminal, and the image processing apparatus, on the operating section of the image processing apparatus receiving an operation to give an instruction for a continuation of the setup operation or setup operations, reflects the setup information to the setup screen displayed on the display section of the image processing apparatus.

8. The image processing system of claim 7, wherein the image processing apparatus receives a setup operation or setup operations of another operator through the operating section of the image processing apparatus without reflecting the setup information to the setup screen, until the operating section of the image processing apparatus receives the operation to give the instruction for the continuation of the setup operation or setup operations.

9. The image processing system of claim 7, wherein the remote terminal sends identification information for identifying the operator to the image processing apparatus, the image processing apparatus receives and stores the identification information, and the image processing apparatus:

receives an input of an identification information inputted through the operating section of the image processing apparatus as a second identification information, compares the identification information received from the remote terminal with the second identification information to determine whether the operator has an operation right to perform setup operations in the image processing apparatus, and reflects the setup information to the setup screen, on the operating section of the image processing apparatus receiving the operation to give the instruction for the continuation of the setup operation or setup operations and on determining that the operator has the operation right.

10. The image processing system of claim 7, further comprising another remote terminal connected with the image processing apparatus by a wireless communication, wherein the remote terminal sends identification information for identifying the operator to the image processing apparatus, and the another remote terminal:

acquires the setup information and the identification information from the image processing apparatus, receives an input of an identification information inputted in the another remote terminal as a third identification information, compares the identification information acquired from the image processing apparatus with the third identification information to determine whether the operator has an operation right to perform setup operations in the another remote terminal, and reflects the setup information to a setup screen about features of the image processing apparatus displayed on a display section of the another remote terminal, on the another remote terminal receiving an operation to give an instruction for the continuation of the setup operation or setup operations and on determining that the operator has the operation right.

11. A remote terminal running on a battery and being connected with an image processing apparatus that can display a setup screen about features of the image processing apparatus, the remote terminal comprising:

an operating section that receives setup operations about the features of the image processing apparatus;

a battery monitoring section that monitors a remaining life of the battery and outputs a notification of a reduction of the remaining life of the battery on the remaining life of the battery becoming a predetermined threshold or less; and a control section that, in response to receiving the notification from the battery monitoring section, sends setup information to an image processing apparatus, the setup information having been set by a setup operation or setup operations of an operator through an operating section until receiving the notification.

12. The remote terminal of claim 11, wherein, when the remaining life of the battery becomes less than or equal to the predetermined threshold, the control section sends identification information that identifies the operator to the image processing apparatus.

* * * * *